J. SHANLEY & N. GORDON.
AUTOMOBILE LIGHT SIGNAL.
APPLICATION FILED JULY 9, 1913.
1,129,740. Patented Feb. 23, 1915.
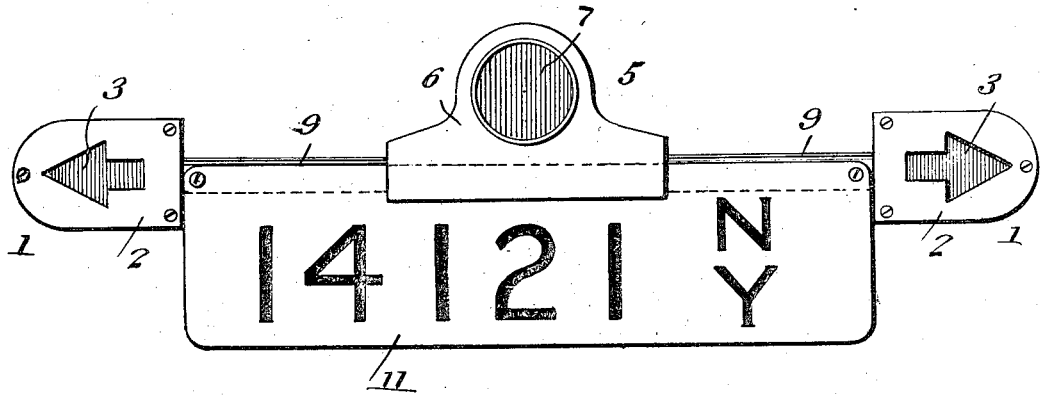
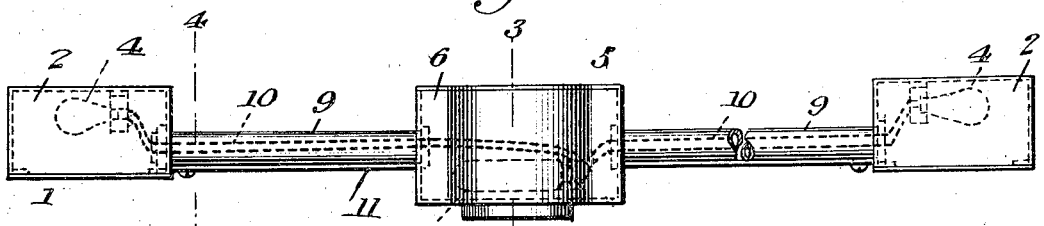
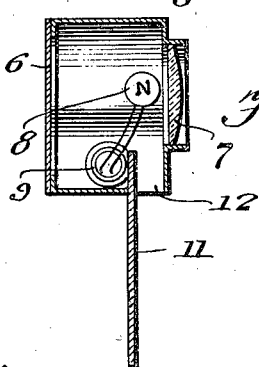
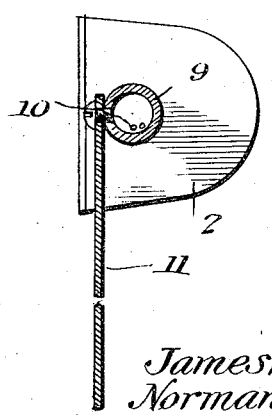
Witnesses
Geo. Ackman Jr.
V. B. Hilliard.
Inventors
James Shanley
Norman Gordon
By Victor J. Evans
Attorney

UNITED STATES PATENT OFFICE.

JAMES SHANLEY AND NORMAN GORDON, OF ROCHESTER, NEW YORK.

AUTOMOBILE LIGHT-SIGNAL.

1,129,740.

Specification of Letters Patent.

Patented Feb. 23, 1915.

Application filed July 9, 1913. Serial No. 778,124.

*To all whom it may concern:*

Be it known that we, JAMES SHANLEY and NORMAN GORDON, citizens of the United States, residing at Rochester, in the county of Monroe and State of New York, have invented new and useful Improvements in Automobile Light-Signals, of which the following is a specification.

The invention provides a signal mechanism designed chiefly for motor vehicles so that the intention of the driver of such vehicle may be ascertained by the operator of a following vehicle or one approaching in the opposite direction, thereby avoiding a casualty when turning either to the right or the left from a straight course.

The invention provides novel means for displaying the signal lights and for receiving and holding the number plate, particularly when the parts are adapted for the rear light.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a front view of a signal light embodying the invention. Fig. 2 is a top plan view. Fig. 3 is a cross section on the line 3—3 of Fig. 2. Fig. 4 is a cross section on the line 4—4 of Fig. 2.

Corresponding and like parts are referred to in the following description, and indicated in all the views of the drawings, by the same reference characters.

The numeral 1 designates side lamps such as are commonly used for automobiles and motor vehicles generally. Each of the lamps consists of a casing 2 which is provided in its front with an opening 3 having the form of the head of an arrow, the point facing outward. The casing 2 contains a light 4 of the electric variety such as commonly used for vehicles. The openings 3 of the casings 2 may be covered by glass or other translucent material, which may be colored so as to present a light of any desired color. When the light on the right is lighted it indicates that the machine is about to turn to the left. The lights 4 are included in electric circuits. A lamp 5 is located centrally between the side lamps 1 and is intended to be lighted at all times after dark and provides the usual tail lamp generally required to be carried by all motor vehicles. The lamp 5 consists of a casing 6 having an opening in its front which is covered by translucent material 7. A light 8 is arranged within the casing 6 and is included in the same circuit with the lights 4. A tube 9 connects each of the side lamps with the center lamp and is secured at its ends to the casings of the respective lamps. These tubes also receive the wires 10 by means of which the current is supplied to the several lights. The lights embody the usual incandescent electric light bulbs.

The number plate 11 is attached to the outer ends of the tubes 9 and serves in a measure to strengthen and brace the same. The light from the center lamp illuminates the number plate and a portion of the casing 6 overhangs the number plate and is open at its bottom, as shown at 12, to permit the rays of light to shine upon the number plate. The lower portion of the casing 6 flares to spread the light and make it possible to read the matter on the number plate at some distance from the vehicle.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative and that such changes may be made when desired as are within the scope of the claim appended hereto.

Having thus described the invention, what is claimed as new is:—

In combination, a center and side lamps each including a casing and a light source, the casing of the center lamp having its lower portion flared and open at its bottom, tubes connecting the casings of the side lamps with the casing of the center lamp, and a number plate attached at its ends to the outer ends of the tubes and rearwardly spaced from and underlapping the front portion of the center lamp to be illuminated by the rays shed through the opening in the bottom thereof.

In testimony whereof we affix our signatures in presence of two witnesses.

JAMES SHANLEY.
NORMAN GORDON.

Witnesses:
 JOHN W. MORRIS,
 EDWARD McDONOUGH.